(12) United States Patent
Moriwaki et al.

(10) Patent No.: US 8,484,684 B2
(45) Date of Patent: Jul. 9, 2013

(54) DISPLAY CONTROL APPARATUS AND METHOD AND PROGRAM

(75) Inventors: Kenichi Moriwaki, Tokyo (JP); Naoki Fukino, Kanagawa (JP); Kazuto Nishizawa, Kanagawa (JP); Ko Kusanagi, Tokyo (JP)

(73) Assignee: Sony Corporation (JP)

( * ) Notice: Subject to any disclaimer, the term of this patent is extended or adjusted under 35 U.S.C. 154(b) by 262 days.

(21) Appl. No.: 11/485,580

(22) Filed: Jul. 12, 2006

(65) Prior Publication Data

US 2007/0050811 A1 Mar. 1, 2007

(30) Foreign Application Priority Data

Aug. 31, 2005 (JP) ................. 2005-252152

(51) Int. Cl.
*G06F 3/00* (2006.01)
*G06F 13/00* (2006.01)
*H04N 5/445* (2006.01)

(52) U.S. Cl.
USPC .............................................. 725/53; 725/57

(58) Field of Classification Search
USPC ....................................................... 725/53, 57
See application file for complete search history.

(56) References Cited

U.S. PATENT DOCUMENTS

| | | | |
|---|---|---|---|
| 6,481,011 B1* | 11/2002 | Lemmons | 725/47 |
| 6,690,391 B1* | 2/2004 | Proehl et al. | 715/720 |
| 6,925,650 B1* | 8/2005 | Arsenault et al. | 725/39 |
| 6,990,635 B2* | 1/2006 | Kurapati et al. | 715/747 |
| 2003/0154482 A1* | 8/2003 | Tsukamoto et al. | 725/53 |
| 2003/0200545 A1* | 10/2003 | Nakada | 725/53 |
| 2004/0146278 A1* | 7/2004 | Shin | 386/69 |
| 2004/0233238 A1* | 11/2004 | Lahdesmaki | 345/810 |
| 2005/0080764 A1* | 4/2005 | Ito | 707/1 |
| 2005/0235209 A1* | 10/2005 | Morita et al. | 715/716 |
| 2006/0020970 A1* | 1/2006 | Utsuki et al. | 725/39 |

(Continued)

FOREIGN PATENT DOCUMENTS

| | | |
|---|---|---|
| JP | 11252477 A | 9/1999 |
| JP | 2001016520 A | 1/2001 |

(Continued)

OTHER PUBLICATIONS

Matsushita Electric Industrial Co., Ltd., "PX500 Series Plasma Television/Liquid Crystal Display Television "VIERA", Panasonic", (Searched on Aug. 23, 2005), Internet, <URL:http//panasonic.jp/viera/products/px500/network.html>.

(Continued)

*Primary Examiner* — Vivek Srivastava
*Assistant Examiner* — Ricky Chin
(74) *Attorney, Agent, or Firm* — Lerner, David, Littenberg, Krumholz & Mentlik, LLP

(57) ABSTRACT

Disclosed herein is a display control apparatus including: a selecting block configured to select from programs to be broadcast on each channel, a program of which program information contains a registered keyword; and a display controlling block configured to display predetermined information in the vicinity of an icon indicative of a channel on which a program selected by said selecting block is broadcast among icons to be displayed in line as information indicative of a selectable channel and, when a predetermined operation is executed in a status in which a channel with said predetermined information displayed in the vicinity of an icon is selected, displaying said keyword contained in program information of a program to be broadcast on a selected channel.

6 Claims, 13 Drawing Sheets

U.S. PATENT DOCUMENTS

| | | | |
|---|---|---|---|
| 2006/0024021 A1* | 2/2006 | Utsuki et al. | 386/46 |
| 2006/0136246 A1* | 6/2006 | Tu | 705/1 |
| 2008/0184315 A1* | 7/2008 | Ellis et al. | 725/60 |
| 2009/0317052 A1* | 12/2009 | Sezan et al. | 386/52 |

FOREIGN PATENT DOCUMENTS

| | | |
|---|---|---|
| JP | 2001257960 A | 9/2001 |
| JP | 2003-114903 A | 4/2003 |
| JP | 2003219300 A | 7/2003 |
| JP | 2004356774 A | 12/2004 |
| JP | 2005-039748 A | 2/2005 |
| JP | 2005-057713 A | 3/2005 |
| JP | 2005079988 A | 3/2005 |
| WO | 2005-015902 A1 | 2/2005 |

OTHER PUBLICATIONS

Office Action from Japanese Application No. 2005-252152, dated May 24, 2011.

Office Action from Japanese Application No. 2005-252152, dated Aug. 9, 2011.

\* cited by examiner

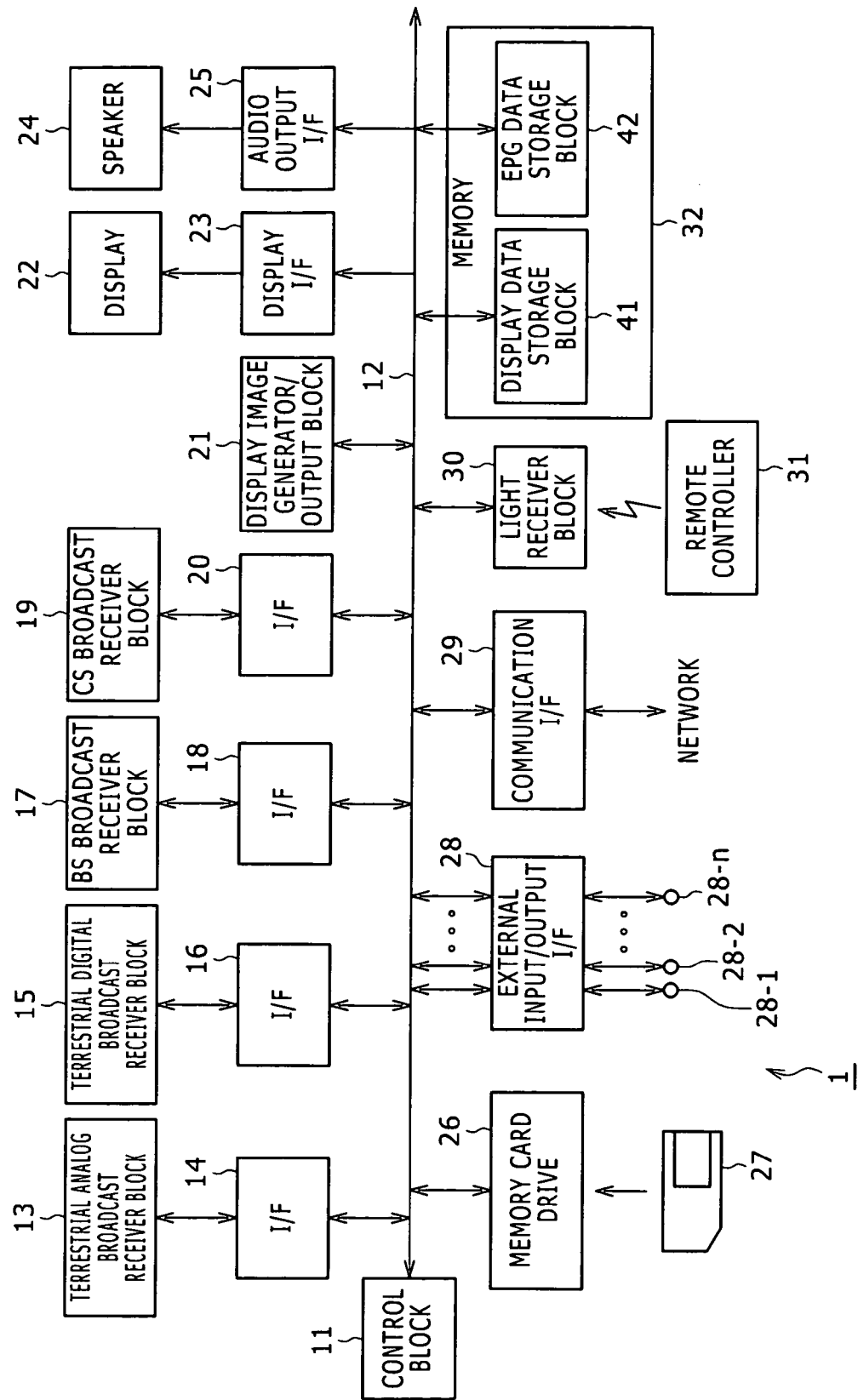

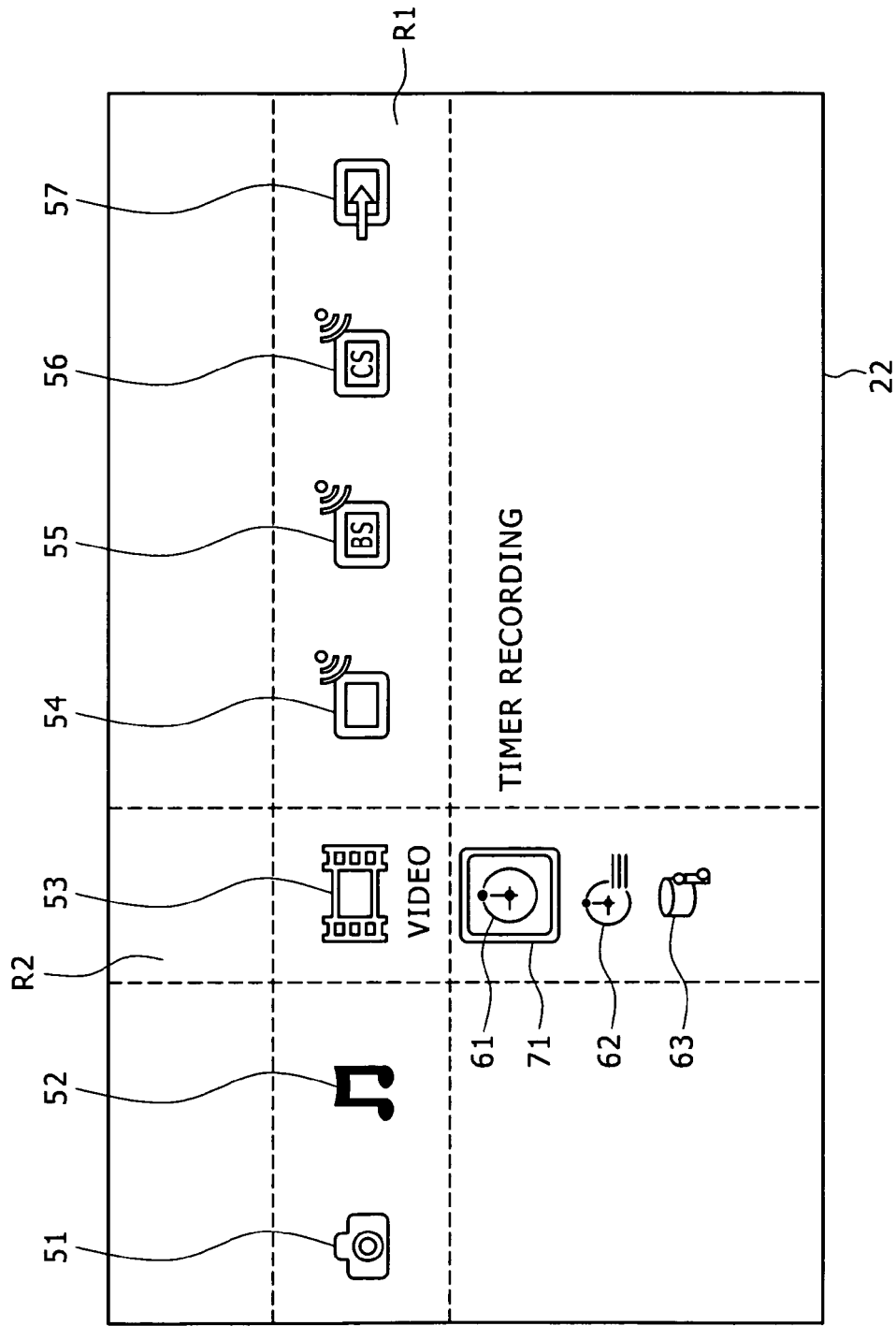

F I G . 1 2
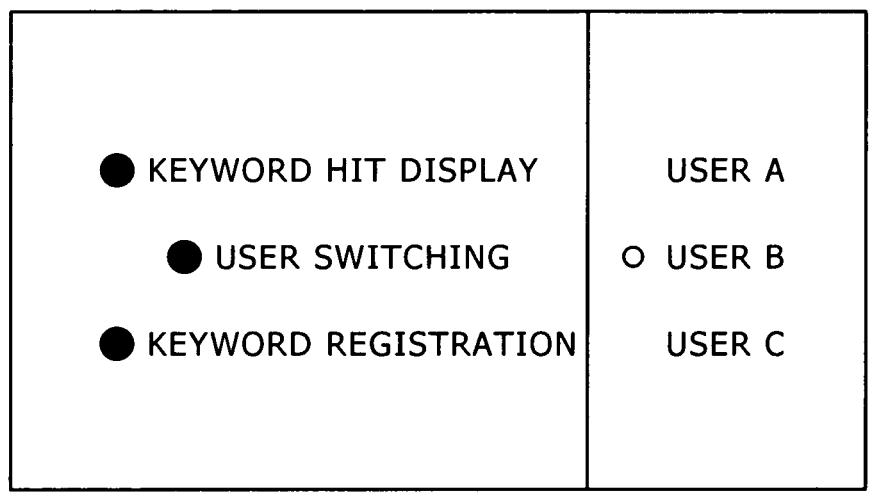

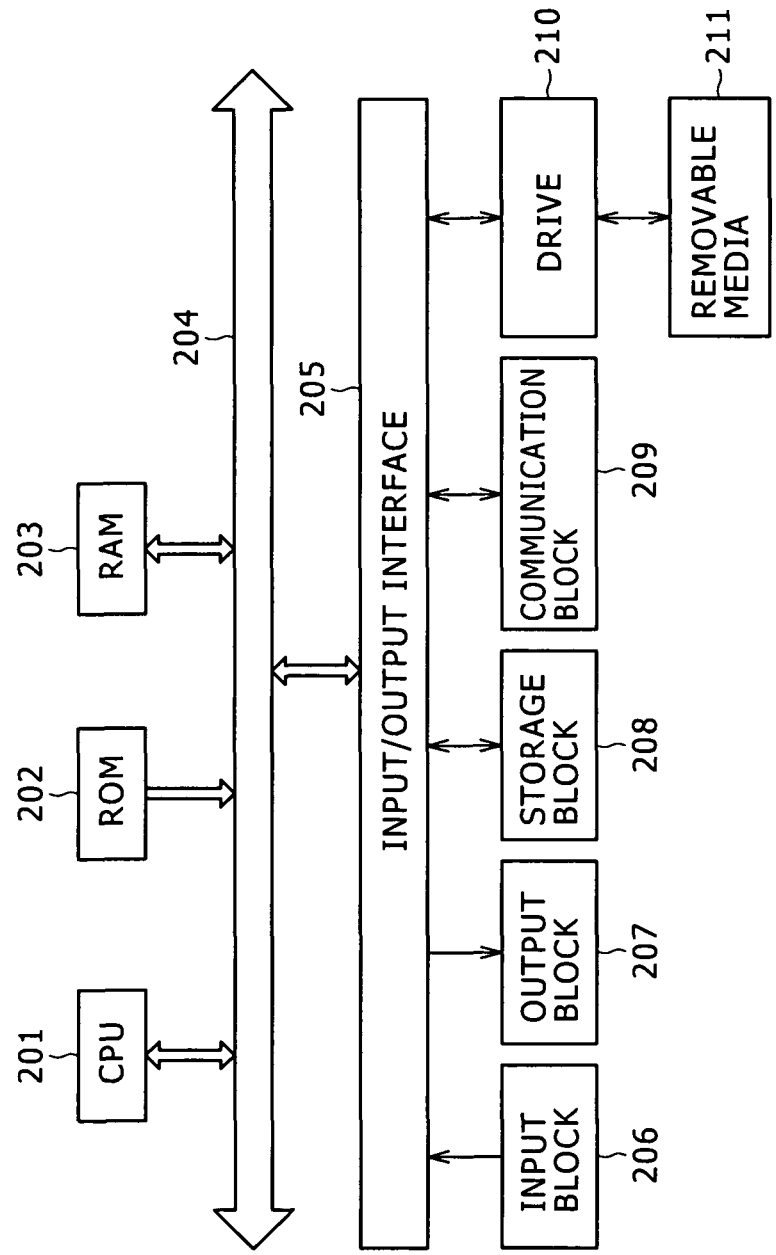

DISPLAY CONTROL APPARATUS AND METHOD AND PROGRAM

CROSS-REFERENCE TO RELATED APPLICATIONS

The present application claims priority from Japanese Patent Application No. JP 2005-252152 filed on Aug. 31, 2005, the disclosure of which is hereby incorporated by reference herein.

BACKGROUND OF THE INVENTION

1. Field of the Invention

The present invention relates to a display control apparatus and method and a program and, more particularly, to a display control apparatus and method and a program for displaying screens that users can view with ease and displaying keywords by which program selection has been made as need arises.

2. Description of the Related Art

Some of the recently marketed television receivers and digital recording devices including hard disc recorders and DVD (Digital Versatile Disc) recorders have capabilities of presenting programs suited to user preferences as recommended programs.

For recommended programs, these programs which have user-registered keywords in program information are selected from among the programs of which program information has been obtained on the basis of EPG (Electronic Program Guide) data, for example Matsushita Electric Industrial Co., Ltd., "PX500 Series Plasma Television/Liquid Crystal Display Television "VIERA", Panasonic", (Searched on Aug. 23, 2005), Internet, <URL:http//panasonic.jp/viera/products/px500/network.html> discloses a technique in which a program considered to be suited to user preference is selected from those scheduled to be broadcast and a recommendation marker is attached to a column of a program guide in which information about the selected program is displayed in radio/television program column, along with information associated with the title and cast of the program.

SUMMARY OF THE INVENTION

It is also proposed to display, along with program titles, information such as a keyword by which program recommendation has been made onto a screen for displaying selected recommended programs in a list form. This technique allows the user to make a confirmation of the reason why a particular program has been selected as a recommended program, thereby using the keyword information for the selection of a program to be viewed or a program to be recorded. However, this technique needs the allocation of an area in which to display a keyword, thereby accordingly reducing the number of programs that can be displayed on one screen.

If a marker indicative that a particular program is recommended is displayed without displaying the information by which the recommendation has been made, it is obviously difficult for the user to make a confirmation of the reason why that program has been recommended.

Therefore, the present invention addresses the above-identified and other problems associated with related-art methods and apparatuses and solves the addressed problems by providing a display control apparatus and method and a program that are capable of displaying screens that the user can view with ease and displaying keywords by which program selections have been made as need arises.

According to an embodiment of the present invention, there is provided a display control apparatus. This apparatus has a selection block for selecting, from programs to be broadcast on each channel, a program of which program information contains a registered keyword; and a display controlling block for displaying predetermined information in the vicinity of an icon indicative of a channel on which a program selected by the selecting block is broadcast among icons to be displayed in line as information indicative of a selectable channel and, when a predetermined operation is executed in a status in which a channel with the predetermined information displayed in the vicinity of an icon is selected, displaying the keyword contained in program information of a program to be broadcast on a selected channel.

The above-mentioned display control apparatus further has a registration block for registering, for each user, keywords specified by a plurality of users, wherein the selecting block selects a program of which program information contains a keyword specified by a user from programs to be broadcast on each channel.

The above-mentioned display control apparatus further has a registration block for registering, for each user, keywords specified by a plurality of users, wherein the selecting block selects a program of which program information contains the keyword specified by a plurality of users from programs to be broadcast on each channel and the display controlling block displays information that is different for different users who specified a keyword on which program selection is based in the vicinity of an icon indicative of a channel on which a program selected by the selecting block is broadcast.

According to another embodiment of the present invention, there is provided a display control method or a display control program. The program control method or the program control program has the steps of selecting, from programs to be broadcast on each channel, a program of which program information contains a registered keyword; and displaying predetermined information in the vicinity of an icon indicative of a channel on which a selected program is broadcast among icons to be displayed in line as information indicative of a selectable channel and, when a predetermined operation is executed in a status in which a channel with the predetermined information displayed in the vicinity of an icon is selected, displaying the keyword contained in program information of a program to be broadcast on a selected channel.

According to yet another embodiment of the present invention, a program of which program information contains a registered keyword is selected from programs to be broadcast on each channel and predetermined information is displayed in the vicinity of an icon indicative of a channel on which a selected program is broadcast, from among icons to be displayed in line as information indicative of selectable channels. When a predetermined operation is executed in a status in which a channel with the predetermined information displayed in the vicinity of an icon, the above-mentioned keyword contained in the program information of a program to be broadcast on the selected channel is displayed.

According to yet another embodiment of the present invention, screens that are easy for users to view are displayed and keywords on the basis of which broadcast programs are selected are displayed as need arises.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a block diagram illustrating an exemplary configuration of a DTV practiced as one embodiment of the invention;

FIG. 2 is a schematic diagram illustrating an exemplary display of menu screen;

FIG. 12 is a diagram illustrating exemplary items; and

FIG. 13 is a block diagram illustrating an exemplary configuration of a personal computer.

DETAILED DESCRIPTION

Figure 3:
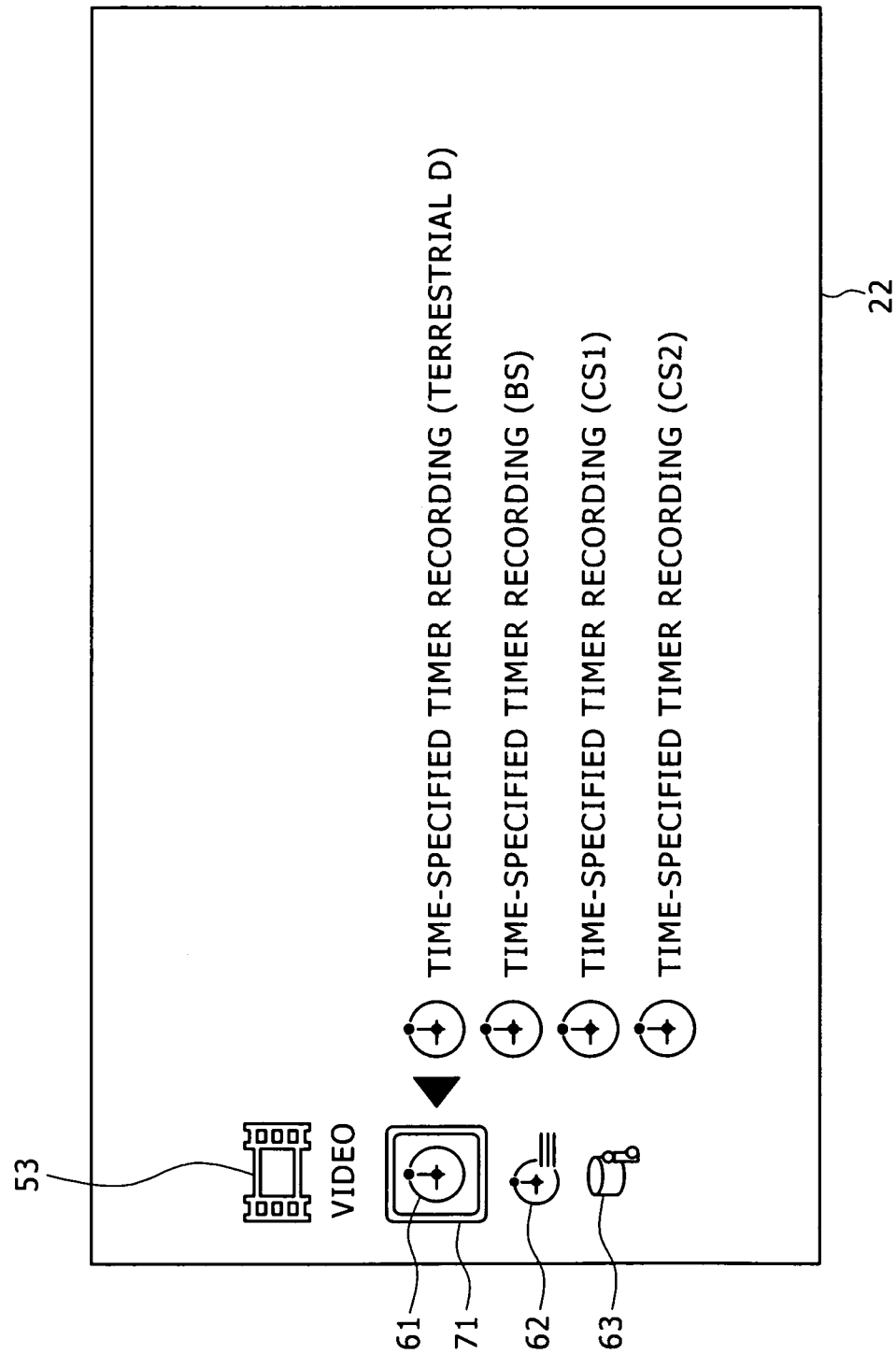
FIG. 3 is a schematic diagram illustrating another exemplary display of menu screen.

This invention will be described in further detail by way of embodiments thereof with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

According to an embodiment of the present invention, a display control apparatus (for example, a DTV 1 shown in FIG. 1) has selecting means (a service module 103 shown in FIG. 9 for example) for selecting, from programs to be broadcast on each channel, a program of which program information contains a registered keyword; and display controlling means (a BS broadcast plug-in 113 shown in FIG. 9 for example) for displaying predetermined information (a star-shaped icon for example) in the vicinity of an icon indicative of a channel on which a program selected by the selecting means is broadcast among icons to be displayed in line as information indicative of a selectable channel and, when a predetermined operation (an operation of an option key arranged on a remote controller for example) is executed in a status in which a channel with the predetermined information displayed in the vicinity of an icon is selected, displaying the keyword contained in program information of a program to be broadcast on a selected channel.

The above-mentioned display control apparatus further has registration means (a setting plug-in 111 shown in FIG. 9 for example) for registering, for each user, keywords specified by a plurality of users.

According to an embodiment of the present invention, the program control method or the program control program according to one aspect of the present invention has the steps of selecting (step S24 shown in FIG. 11 for example), from programs to be broadcast on each channel, a program of which program information contains a registered keyword and displaying (step S26 shown in FIG. 11 for example) predetermined information in the vicinity of an icon indicative of a channel on which a selected program is broadcast among icons to be displayed in line as information indicative of a selectable channel and, when a predetermined operation is executed in a status in which a channel with the predetermined information displayed in the vicinity of an icon is selected, displaying the keyword contained in program information of a program to be broadcast on a selected channel.

The following describes embodiments of the present invention with reference to accompanying drawings.

Now, referring to FIG. 1, there is shown an exemplary configuration of the DTV 1 practiced as one embodiment of the invention.

The DTV 1 is configured as connected in components thereof to a control block 11 made up of a CPU (Central Processing Unit), a ROM (Read Only Memory), and a RAM (Random Access Memory) for example via a bus 12.

A terrestrial analog broadcast receiver block 13 receives a terrestrial analog television broadcast signal under the control of the control block 11, demodulates the received signal, and outputs resultant image signal (or a video signal) and audio signal to the bus 12 via an interface (I/F) 14. The control block 11 gives a command to the terrestrial analog broadcast receiver block 13 to receive a channel selected by the user by use of a remote controller 31. Likewise, the control block 11 gives commands to other broadcast receiver blocks in accordance with the operations done by the user.

The terrestrial digital broadcast receiver block 15, corresponding to digital television broadcast and data broadcast, receives terrestrial digital broadcasts under the control of the control block 11. The terrestrial digital broadcast receiver block 15 outputs the image audio signals and EPG (Electronic Program Guide) data for example of each program obtained by decoding the received broadcast signal to the bus 12 via an interface (I/F) 16.

A BS (Broadcasting Satellite) broadcast receiver block 17, corresponding to BS television broadcast, BS audio broadcast (or radio broadcast), and data broadcast, receives BS digital broadcast under the control of the control block 11. The BS broadcast receiver block 17 outputs the image and audio signals and EPG data for example of each program obtained by decoding the received broadcast signal to the bus 12 via an interface (I/F) 18.

A CS (Communications Satellite) broadcast receiver block 19, corresponding to CS television broadcast, CS audio broadcast, and data broadcast, receives CS digital broadcast under the control of the control block 11. The CS broadcast receiver block 19 outputs the image and audio signals and EPG data for example of each program obtained by decoding the received broadcast signal to the bus 12 via the interface (I/F) 20.

A display image generator/output block 21 displays a variety of images onto a display 22 under the control of the control block 11. For example, the display image generator/output block 21 displays the images of a program onto the display 22 on the basis of the image data supplied from the terrestrial analog broadcast receiver block 13, the terrestrial digital broadcast receiver block 15, the BS broadcast receiver block 17, or the CS broadcast receiver block 19 via the bus 12. The audio signal of the received program is sounded from a speaker 24 under the control of the control block 11 for example in synchronization with the image of the program outputted from the display image generator/output block 21.

The display image generator/output block 21 has an OSD (On Screen Display) capability by which a menu screen that is GUI (Graphical User Interface) for allowing the user to execute various operations through the DTV 1 is displayed on the display 22 under the control of the control block 11. The data about icons such as characters and symbols to be arranged on the menu screen is stored in a display data storage block 41 of a memory 32.

Further, the display image generator/output block 21 switches between menu screens in accordance with notification by the control block 11 of a menu screen operation done by the user.

The display 22, based on an LCD (Liquid Crystal Display) for example, displays program images and menu screens for example under the control of the display image generator/output block 21 via the bus 12 and a display interface (I/F) 23. Menu screens to be shown in the display 22 will be detailed later.

The speaker 24 sounds the audio data supplied from the terrestrial analog broadcast receiver block 13, the terrestrial digital broadcast receiver block 15, the BS broadcast receiver block 17, or the CS broadcast receiver block 19 via the bus 12 and an audio output interface (I/F) 25, under the control of the control block 11 and so on.

A memory card drive 26 reads data from a memory card 27 loaded in a slot arranged in a housing of the DTV 1 and writes data to the memory card 27 loaded in that slot. The memory card drive 26 reads such data from the memory card 27, for example, as still picture data taken with a digital camera and outputs the read data to the display image generator/output block 21 via the bus 12. The display image generator/output block 21 displays still images on the basis of the data read from the memory card 27.

An external input/output interface (I/F) 28 transmits and receives data (or signals) with devices connected to such external input/output terminals 28-1 through 28-n via various cables as a video input/output terminal, an audio input/output terminal, a USB (Universal Serial Bus) terminal, an IEEE (Institute of Electrical and Electronics Engineers) 1394 terminal, and an HDMI (High-Definition Multimedia Interface) terminal.

For example, if a digital camera or an audio player is connected to the DTV 1 via a USB cable, the external input/output interface (I/F) 28 captures the still picture data taken with the digital camera or the audio data stored in the audio player. In addition, if a hard disc recorder (HDR) is connected to the DTV 1 via an IEEE 1394 cable, the external input/output interface (I/F) 28 stores the program data (video signal and audio signal) of a digital broadcast obtained by the terrestrial digital broadcast receiver block 15 into the HDR via an IEEE 1394 cable or obtains the program data from the HDR via the IEEE 1394 cable to display the obtained data onto the display image generator/output block 21 as program images.

A communication interface (I/F) 29 transmits and receives data with various devices via a network. For example, if a network-compatible recording/reproducing device is connected to the DTV 1 via network, the communication interface (I/F) 29 stores the program data of a digital broadcast obtained by the terrestrial digital broadcast receiver block 15 into the connected recording/reproducing device or displays the program data supplied from the connected recording/reproducing device onto the display image generator/output block 21 via network as program images.

A light receiver block 30 receives infrared radiation from a remote controller 31 and outputs a signal obtained by demodulating the received infrared radiation, which corresponds to an operation done by the user, to the control block 11 via the bus 12. The remote controller 31 has a cross key, an enter key, and a home key for displaying a menu screen, for example.

The memory 32, made up of a flash memory, has a display data storage block 41 and an EPG data storage block 42. The display data storage block 41 stores data of icons for displaying menu screens. The EPG data storage block 42 stores EPG data obtained from the terrestrial analog broadcast receiver block 13, the terrestrial digital broadcast receiver block 15, the BS broadcast receiver block 17, and the CS broadcast receiver block 19. The EPG data contains the station name (or channel name), title, broadcast start time, broadcast end time, cast, genre, and so on of each program and is used for displaying each program guide. It should be noted that EPG data obtained by the communication interface (I/F) 29 by downloading from a predetermined server may be stored in the EPG data storage block 42 to be used for displaying a program guide.

The following describes menu screens to be displayed by the DTV 1 configured as described above.

Now, referring to FIG. 2, there is shown an exemplary menu screen to be displayed on the display 22.

A menu screen as shown in FIG. 2 is displayed when the user presses the home key arranged on the remote controller 31, for example. This displayed menu screen allows the user to execute various selective operations, such as the selection of broadcast channels, the selection of programs broadcast on a selected channel, and the selection of various capabilities of the DTV 1. It should be noted that dashed lines shown in FIG. 2 are provided for the convenience of description and therefore not actually shown on the menu screen.

The menu screen is configured such that category icon array R1 in which a plurality of category icons are lined up and item icon array R2 in which item icons indicative of items belonging to a category chosen from the category icons arranged in category icon array R1 cross each other at an upper left position relative to the center of the screen.

As shown in FIG. 2, category icon array R1 is displayed in the horizontal (or lateral) direction of the display 22 and item icon array R2 is displayed in a direction perpendicular to category icon array R1 (or in the vertical direction of the display 22). The data about icons forming these arrays is stored in the display data storage block 41 shown in FIG. 1.

category icon array R1 is configured by arranging nine types of category icons, for example. Each of the icons will be detained later. In the example shown in FIG. 2, a photo icon 51 indicative of category "photo", a music icon 52 indicative of category "music", a video icon 53 indicative of category "video", a terrestrial broadcast icon 54 indicative of category "terrestrial broadcast", a BS broadcast icon 55 indicative of category "BS broadcast", a CS broadcast icon 56 indicative of category "CS broadcast", and an external input icon 57 indicative of category "external input" are displayed among the nine types of categories.

When the user operates the remote controller 31 to switch between display ranges, a setting icon indicative of category "setting" and a network icon indicative of category "network" are displayed accordingly.

In the example shown in FIG. 2, the video icon 53 is selected from the category icons arranged horizontally and this selected video icon 53 is displayed slightly larger than the other category icons. Below the video icon 53, text "video" indicative that video category is selected is displayed.

In the example shown in FIG. 2, item icons 61 through 63 are displayed as icons indicative of items belonging to video category selected by the user. The number of icons belonging to a particular category depends thereon; for example, as shown in FIG. 2, icons indicative of a predetermined number of icons are shown in the menu screen.

An item icon 61 is indicative of an item to be selected when setting timer recording. An item icon 62 is indicative of an item to be selected when checking the contents of timer recording. An item icon 63 is indicative of the HDR connected to the DTV 1 via IEEE 1394 cable. Selecting the item icon 63, the user can reproduce a program recorded to the HDR, for example.

In the example shown in FIG. 2, the item icon 61 is selected from an item icon group of item icons 61 through 63 and the selected item icon 61 is displayed as in a cursor 71. To the right of the item icon 61, text "timer recording" is displayed, indicating that the selection of this icon allows the setting of timer recording.

On a menu screen such as described above, the user basically can select a category by horizontally operating (or operating horizontally arranged keys on) the cross key on the remote controller 31 and an item belonging to the selected category by vertically operating (or operating vertically arranged keys on) the cross key.

In accordance with a horizontal operation done by the user, all icons forming category icon array R1 collectively move to be displayed. In accordance with a vertical operation done by the user, all item icons forming item icon array R2 collectively move to be displayed.

For example, if the user presses the left button once in a status in which with "video" is selected, all category icons forming category icon array R1 move to the right, the music icon 52 is displayed at the position at which the video icon 53 is currently displayed, and the photo icon 51 is displayed at the position at which the music icon 52 is currently displayed. At the position at which the photo icon 51 is displayed, the setting icon indicative of "setting" arranged to the left of the photo icon 51 in category icon array R1 for example is displayed.

Likewise, the video icon 53 is displayed at the position at which the terrestrial broadcast icon 54 is displayed. The terrestrial broadcast icon 54 is displayed at the position at which the BS broadcast icon 55 is displayed. The BS broadcast icon 55 is displayed at the position at which CS broadcast icon 56 is displayed. The CS broadcast icon 56 is displayed at the position at which the external input icon 57 is displayed. The external input icon 57 shown at the right end in FIG. 2 disappears.

Consequently, "music" is selected in place of "video", thereby lining up the item icons belonging to "music" in the vertical direction as item icon array R2.

On the other hand, if the user presses the right-side button once in the status shown in FIG. 2, then, unlike the pressing of the left-side button, all category icons forming category icon array R1 move to the left, entering a status in which "terrestrial broadcast" is selected. At the same time, item icons belonging to category "terrestrial broadcast" are displayed as lined up in the vertical direction as item icon array R2.

If the user presses the lower button once in status shown in FIG. 2, all item icons forming item icon array R2 move upward. The item icon 61 is displayed over the video icon 53. The item icon 62 is displayed at the position at which the item icon 61 is currently displayed. At this moment, text "timer recording checking" is displayed to the right of the cursor 71, indicating that the item icon 62 is selected to check the contents of timer recording.

The item icon 63 is displayed at the position at which the item icon 62 is currently displayed. At the position at which the icon 63 is displayed, an item icon to be lined up below the item icon 63 as an item icon forming item icon array R2 is newly displayed.

On the other hand, if the user presses the upper button once in the status shown in FIG. 2, this operation is invalid (that is, no display switching takes place) because there is no item icon to be lined up over the item icon 61 as an item icon forming item icon array R2.

Referring to FIG. 3, there is shown another exemplary display of the menu screen.

If the enter key arranged on the remote controller 31 is pressed in the status shown in FIG. 2 in which "timer recording", one of items belonging to video category, is selected, the screen shown in FIG. 3 is switched to a screen shown in FIG. 2. After the switching, icons indicative of items defined as items of layers below "timer recording" are displayed as lined up in the vertical direction. To the right of each of these icons, a text describing the icon is displayed.

The example shown in FIG. 3 displays icons and corresponding texts associated with an item for specifying a time zone for recording a program to be broadcast by terrestrial digital broadcasting, an item for specifying a time zone for recording a program to be broadcast by BS digital broadcasting, an item for specifying a time zone for recording a program to be broadcast by CS digital broadcasting (CS1), and an item for specifying a time zone for recording a program to be broadcast by CS digital broadcasting (CS2).

Selecting a predetermined item from the items displayed as lined up in the vertical direction allows the user to specify a recording time zone for a program to be broadcast by each broadcasting wave. For example, the cursor 71 is displayed as selecting the item of terrestrial digital broadcast displayed in the top layer of the items of lower layers. In this status, the user can switch between the items to be selected by vertical operation and, at the same time, select a predetermined item by pressing the enter key.

It should be noted that, in the example shown in FIG. 3, category icons forming category icon array R1 disappears from the screen except for the selected video icon 53 and the display position of item icon array R2 moves to the left end of the screen, thereby displaying, in the empty space, icons indicative of items of lower layers and texts corresponding to these icons.

Figure 4:
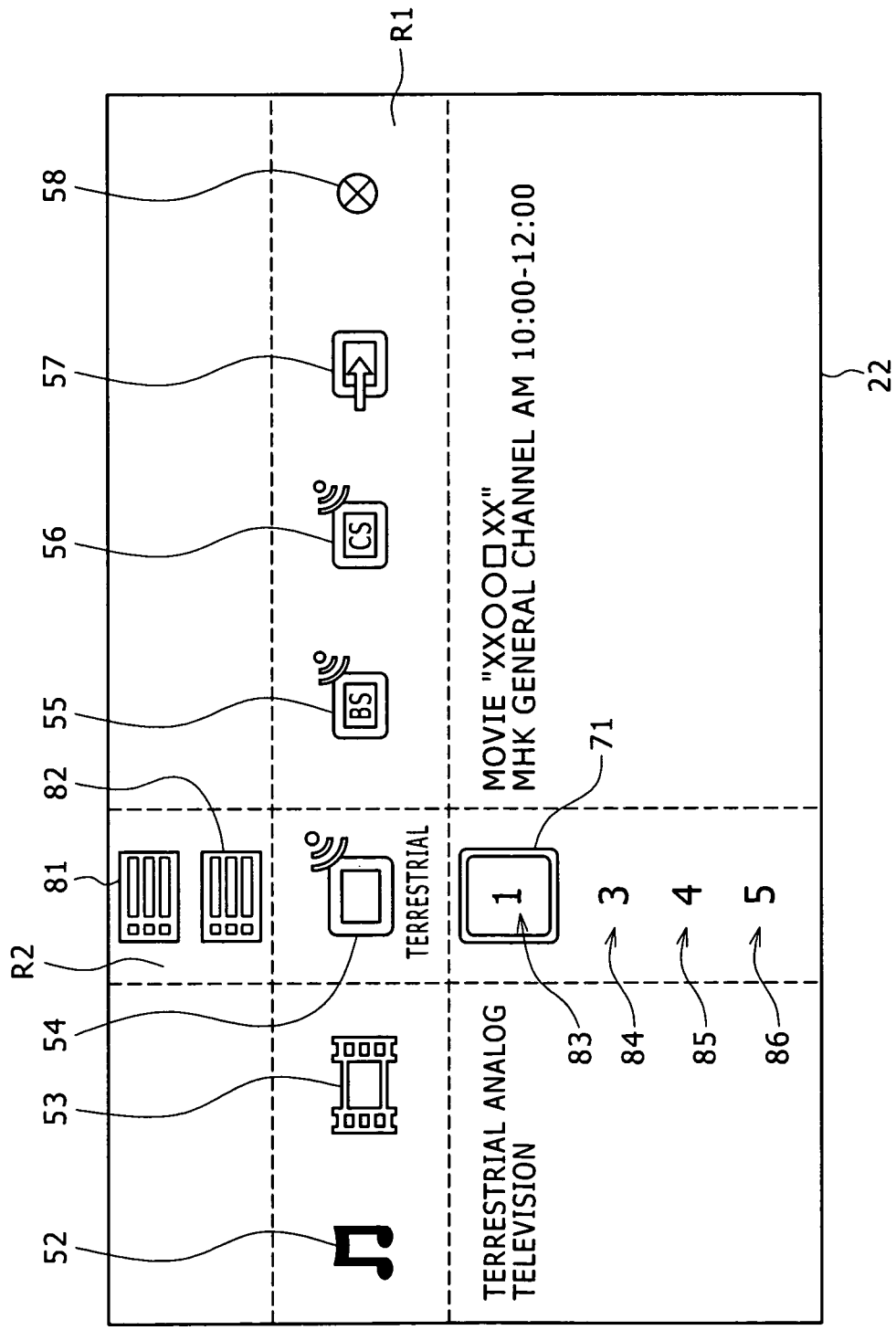
FIG. 4 is a schematic diagram illustrating still another exemplary display of menu screen.

Referring to FIG. 4, there is shown still another example of the menu screen.

When the right-side button of the cross key is pressed once in the status shown in FIG. 2 in which the video category is selected from category icon array R1, "terrestrial broadcast" is put in the selected status and the item icons belonging to "terrestrial broadcast" are displayed as lined up in the vertical direction.

In the example shown in FIG. 4, item icons 81 and 82 are displayed over the terrestrial broadcast icon 54 and channel icons 83 through 86 are displayed below the terrestrial broadcast icon 54.

The item icon 81 is indicative of an item to be selected to display a program guide of programs to be broadcast by terrestrial analog broadcasting. The item icon 82 is indicative of an item to be selected to display a program guide of programs to be broadcast by terrestrial digital broadcasting. The channel icons 83 through 86 are indicative of channel 1, channel 3, channel 4, and channel 5 respectively.

By pressing the vertical buttons of the cross key, the user can switch between items to be selected by the cursor 71. By pressing the enter key with a predetermined item selected, the user can display a program guide or view a program being broadcast on a selected channel in accordance with an item selected at that moment.

In the example shown in FIG. 4, channel 1 is selected. To the left of the cursor 71, text "terrestrial analog television" indicative of a group to which the selected channel belongs is displayed. "Terrestrial broadcast" has a group of "terrestrial analog television" (a group of programs to be received by the terrestrial analog broadcast receiver block 13 shown in FIG. 1) and a group of "terrestrial digital television" (a group of programs to be received by the terrestrial digital broadcast receiver block 15 shown in FIG. 1). When a channel belonging to the group of "terrestrial digital television" is selected, a text indicative thereof is displayed.

To the right of the cursor 71, the title "movie "XXOO☐XX"" of a program to be broadcast on selected channel 1, "MHK general channel" indicative of the name of broadcast channel, and "AM 10:00-12:00" indicative of broadcast time zone (broadcast start time and broadcast end time) are displayed in two lines. These pieces of information are displayed on the basis of the EPG data stored in the EPG data storage block 42. If another channel is selected, a program title and other information are likewise displayed to the right of an icon indicative of the selected channel. It should be noted that, in the menu screen shown in FIG. 4, a network icon 58 indicative of "network" is displayed to the right of category icon array R1.

Figure 5:
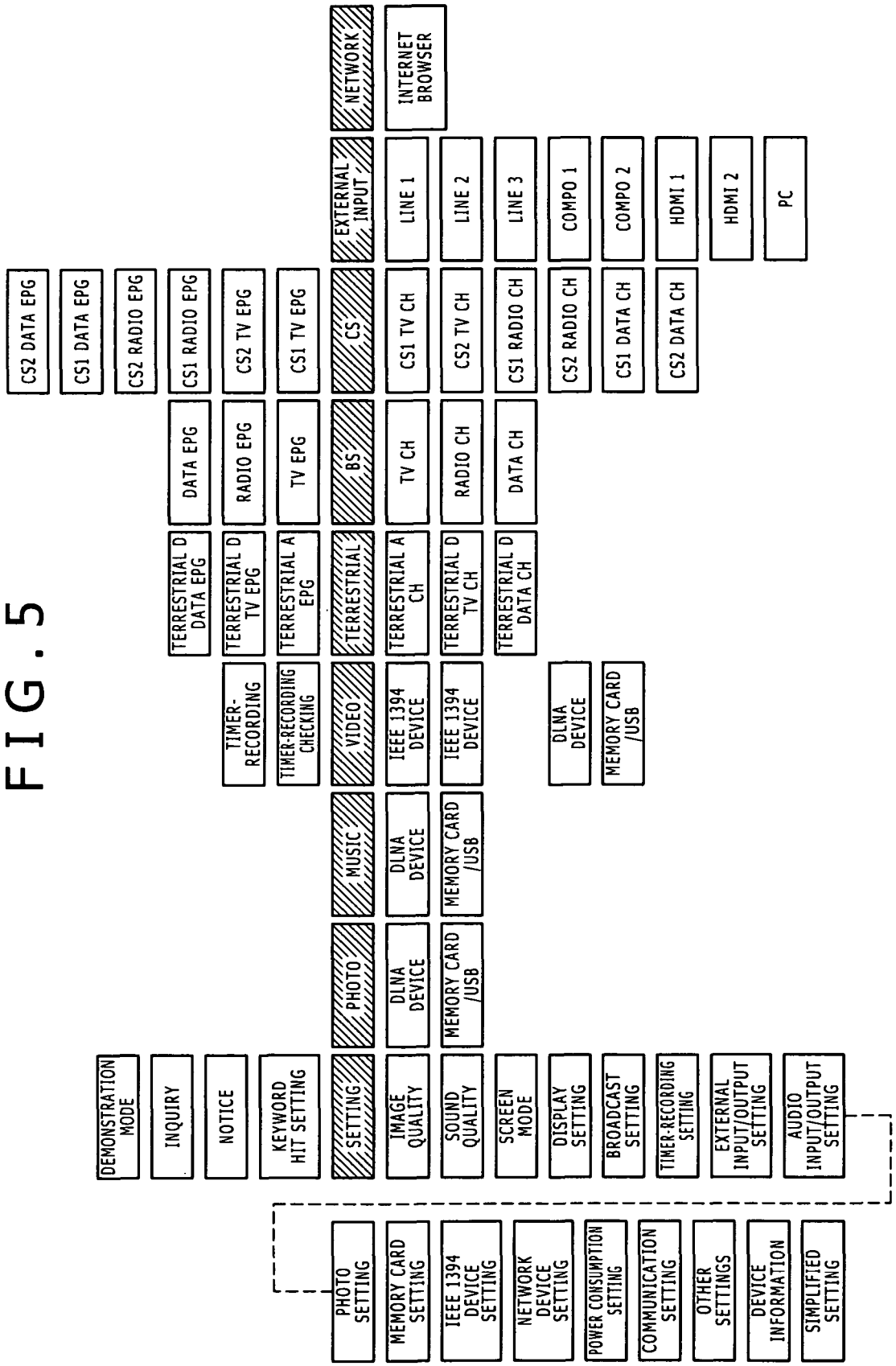
FIG. 5 is a diagram illustrating an exemplary definition map.

Referring to FIG. 5, there is shown an exemplary definition map defining arrays of categories and items.

As indicated by hatching, categories are arranged from the left, "setting", "photo", "music", "video", "terrestrial broadcast", "BS broadcast", "Cs broadcast", "external input", and "network" in this order.

"Setting" is a category associated with various setting operations. Category "setting" has items "demonstration mode" to be selected when displaying a demonstration screen, "inquiry" to be selected when displaying destination of inquiry, "notice" to be selected when displaying messages from manufacturer, and "keyword hit setting" to be selected when registering a keyword that provides a reference for selecting a recommended program selected by the DTV 1 when displaying this recommended program in this order from top down.

Category "setting" also has items "image quality" to be selected when setting an image quality, "sound quality" to be selected when setting a sound quality, "screen mode" when setting a screen mode, and "display setting" to be selected when setting display. Further, category "setting" has items "broadcast setting" to be selected when setting data associated with broadcast to be received, and "timer-recording setting" to be selected when setting timer-recording. Further, category "setting" has items "external input/output setting" to be selected when setting an external device to be connected to the DTV 1, and "audio input/output setting" to be selected when setting audio input/output operation.

Further, category "setting" includes items "photo setting" to be selected when setting data associated with display of still pictures, "memory card setting" to be selected when setting data associated with the memory card 27, "IEEE 1394 device setting" to be selected when setting a device to be connected via IEEE 1394 cable, and "network device setting" to be selected when setting data associated with a device to be connected via a network. Further, category "setting" includes items "power consumption setting" to be selected when setting the power supply mode of the DTV 1, "communication setting" to be selected when setting data associated with the communication capabilities, "other settings" to be selected when setting other settings, "device information" to be selected when displaying information such as serial number of the DTV 1, and "simplified setting" to be selected when displaying a wizard associated with setting.

"Photo" is a category associated with the display of still pictures. Category "photo" has items, from top down, "DLNA device" to be selected when capturing a still image from a digital camera compliant with DLNA (Digital Living Network Alliance) to be connected to the DTV 1 via network and displaying the captured still image and "memory card/USB" to be selected when capturing a still image from the memory card 27 or a digital camera connected via USB cable and displaying the captured still image onto the display 22.

"Music" is a category associated with music. Category "music" has, from top down, items "DLNA device" to be selected when capturing music from an audio player compliant with DLNA connected to the DTV 1 via network and sounding the captured music form the speaker 24 and "memory card/USB" to be selected when capturing music from the memory card 27 or an audio player connected via USB cable and sounding the captured music from the speaker 24.

"Video" is a category associated with the recording of a program. Category "video" has, from top down, items "timer recording" to be selected when setting timer recording and "timer recording checking" to be selected when checking contents of timer recording.

Category "video" also has items "IEEE 1394 device" to be selected when recording a program to a recording/reproducing device connected via IEEE 1394 cable or reproducing a program from the recording/reproducing device, "DLNA device" to be selected when recording a program to a recording/reproducing device compliant with DLNA connected to the DTV 1 via network or reproducing the program from the recording/reproducing device, and "memory card/USB" to be selected when reproducing a moving image from the memory card 27 or a device connected via USB cable.

"Terrestrial broadcast" is a category associated with terrestrial analog broadcast and terrestrial digital broadcast. Category "terrestrial broadcast" has, from top down, items "terrestrial D data EPG" to be selected when displaying a program guide of data broadcast, "terrestrial D TV EPG" to be selected when displaying a program guide of programs to be broadcast by terrestrial digital broadcast, and "terrestrial A EPG" to be selected when displaying a program guide of programs to be broadcast by terrestrial analog broadcast.

Category "terrestrial broadcast" also has "Terrestrial A Ch" (channel icon) to be selected when selecting a terrestrial analog broadcast channel to view a program, "Terrestrial D TV Ch" (channel icon) to be selected when selecting a terrestrial digital broadcast channel to view a program, and "Terrestrial D Data Ch" (channel icon) to be selected when selecting a data broadcast channel to view a program.

"BS broadcast" is a category associated with BS digital broadcast. Category "BS broadcast" has, from top down, items "Data EPG" to be selected when displaying a program guide of data broadcast, "Radio EPG" to be selected when displaying a program guide of programs to be broadcast by radio broadcasting, and "TV EPG" to be selected when displaying a program guide of programs to be broadcast by BS digital broadcast.

Category "BS broadcast" also has items "TV Ch" (channel icon) to be selected when selecting a BS broadcast channel to view a program, "Radio Ch" (channel icon) to be selected when selecting a radio broadcast channel to listen to a radio program, and "Data Ch" (channel icon) to be selected when selecting a data broadcast channel to view a program.

"CS broadcast" is a category associated with CS digital broadcast. Category "CS broadcast" has, from top down, items "Data EPG" to be selected when displaying program guides of data broadcast of CS1 and CS2, "Radio EPG" to be selected when displaying a program guide of programs to be broadcast by radio broadcast, and "TV EPG" to be selected when displaying a program guide of programs to be broadcast by CS digital broadcast.

Category "CS broadcast" also has items "TV Ch" (channel icon) to be selected when a CS broadcast channel is selected to view a program, "Radio Ch" (channel icon) to be selected when selecting a radio broadcast channel to listen to a radio program, and "Data Ch" (channel icon) to be selected when selecting a data broadcast channel to view a program.

"External input" is a category associated with the switching of input signals from an external device into the DTV 1. Category "external input" has, from top down, items "LINE 1" through "LINE 3" to be selected when selecting the output of devices connected to terminals LINE 1 through LINE 3, "Compo 1" and "Compo 2" to be selected when selecting the output of devices connected to terminals of composite 1 and composite 2, "HDMI 1" and "HDMI 2" to be selected when selecting the output of devices connected to terminals of HDMI 1 and HDMI 2, and "PC" to be selected when selecting output from a PC (Personal Computer).

"Network" is a category associated with various processing operations to be executed via network. Category "network" has item "Internet browser" to be selected when starting up an Internet browser and displaying a Web screen on the browser, for example.

Each item appropriately has lower-layer items. When a higher-layer item is selected, the selected item and lower-layer items thereof if any are displayed.

The following details of menu screens to be displayed when one of the broadcast categories ("terrestrial broadcast", "BS broadcast", and "CS broadcast") is selected.

As described above with reference to FIG. 4, when "terrestrial broadcast" that is a broadcast category is selected from category icon array R1, channel icons and so on indicative of channels are displayed in the vertical direction and, beside the channel icon selected with the cursor 71, information such as the title of a program to be broadcast on that channel is displayed. The DTV 1 also has a capability of selecting those programs which are suitable for user preference as recommended program; in the vicinity an icon (or a marker) indicative that the program is a recommended program is displayed in addition to the information such as program title.

Figure 6:
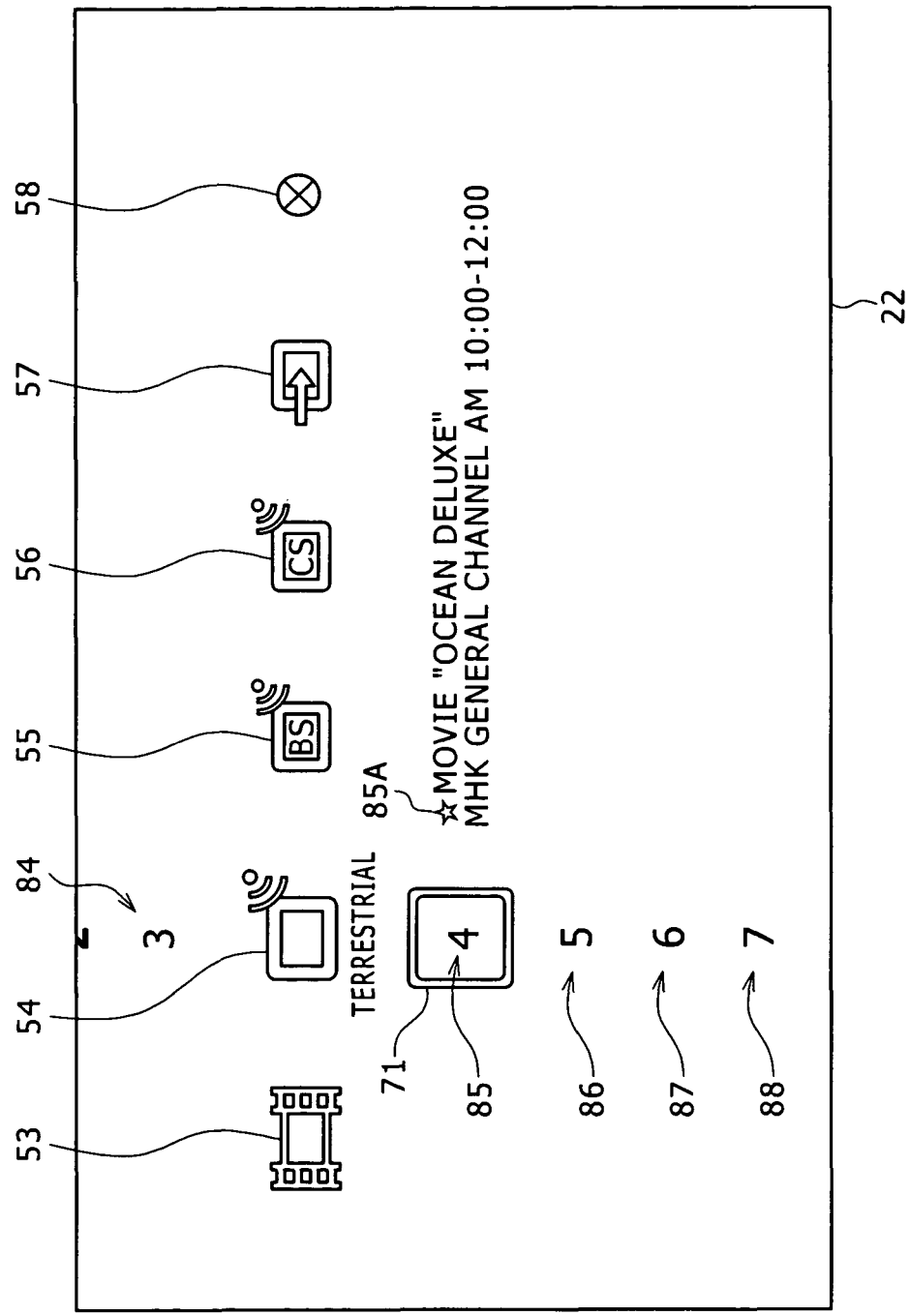
FIG. 6 is a schematic diagram illustrating an exemplary display of menu screen to be displayed when "terrestrial" is selected.

Referring to FIG. 6, there is shown an exemplary display of a menu screen that is displayed when category "terrestrial broadcast" is selected.

In the example shown in FIG. 6, channel icons 84 through 88 indicative of channel 3, channel 4, channel 5, channel 6, and channel 7 respectively are lined up in the vertical direction, the channel icon 85 being selected with the cursor 71.

To the right of the channel icon 85, the information about a program to be broadcast on channel 4 is displayed as title "Ocean Deluxe", channel name "MHK General Channel", and broadcast time zone "AM 10:00-12:00".

In the vicinity (or to the right) of the channel icon 85, a star icon 58A is shown as information. This start icon 85A is indicative that currently selected "Ocean Deluxe" that is a program to be broadcast on channel 4 is a recommended program.

The recommendation of particular programs is executed by the DTV 1 depending on whether a keyword registered by the user beforehand is included in the program information. As described above, the program information such as title and cast is extracted from the EPG data for each program to be broadcast. Programs having the program information in which the user-registered keyword is included are selected as recommended programs.

For example, registering the name of cast of user preference beforehand causes the start icon to be displayed in the vicinity of the channel icon of the channel on which a program in which the cast of user preference performs, so that the user can check for the start icon to select and view a program in which the cast of user preference performs.

It should be noted that, a status in which the information about a one program is displayed as shown in FIG. 6 is indicative of the passing of a predetermined period of time after the selection of channel 4 by user's pressing the up and down button of the cross key.

For example, while the user is pressing the up and down button of the cross key to select a channel (namely, until a predetermined period of time after user's selecting one channel), the information about the programs to be broadcast on all channels for which channel icons are displayed. Like program "Ocean Deluxe" to be broadcast on channel 4, a star icon is also displayed in the vicinity of the channel icon of the program of which program information includes a user-registered keyword.

Figure 7:
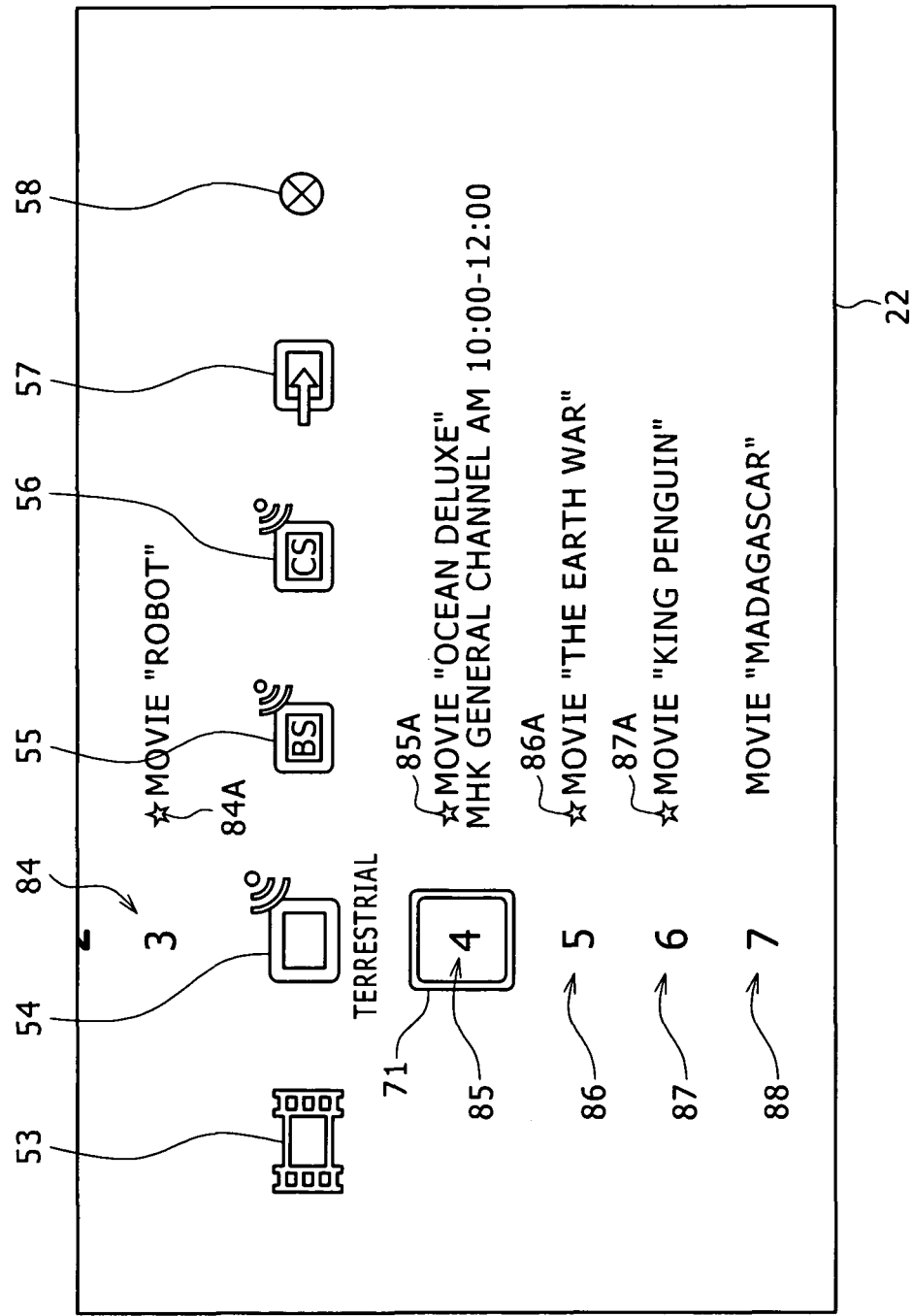
FIG. 7 is a schematic diagram illustrating another exemplary display of menu screen to be displayed when "terrestrial" is selected.

In an example shown in FIG. 7, the titles of programs to be broadcast on channel 3, channel 5, channel 6, and channel 7 are displayed in addition to the information about the program to be broadcast on channel 4. In the vicinity of the channel icon 84 indicative of channel 3, the channel icon 86 indicative of channel 5, and the channel icon 87 indicative of channel 6, star icons 84A, 86A, and 87A are displayed indicating that the programs to be broadcast on these channels are recommended programs, namely, the user-registered keyword is included in the information about the programs to be broadcast on these channels.

No star icon is shown beside the channel icon 88, indicating that program "Madagascar" to be broadcast on channel 7 is not a program of user preference.

Thus, while the user is selecting channels by pressing the up or down button of the cross key, the information about the program to be broadcast on each channel is displayed as well as a star icon indicative user preference beside each channel icon (or channel number), thereby allowing the user to check for a star icon along a channel number.

Referring to FIG. 6 again, when the user presses an option key arranged on the remote controller 31 for example with the channel having a star icon selected, a wider area is accordingly allocated to the selected channel than those allocated to other channels. Displayed in this allocated wider area is other information about a program to be broadcast on the selected channel than that previously shown.

For example, the above-mentioned other information includes the same keyword as that of registered by the user in advance, included in the program information.

Figure 8:
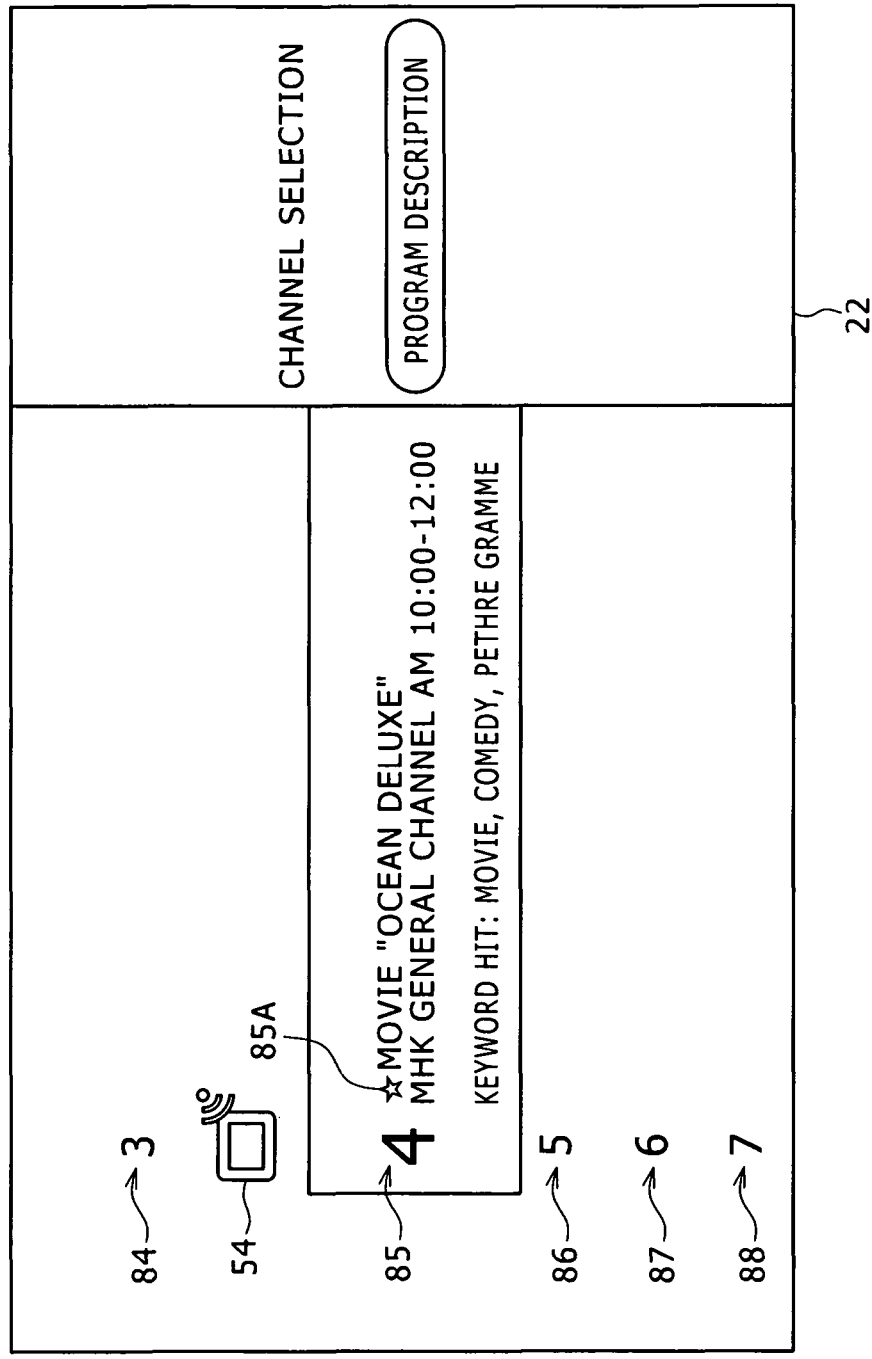
FIG. 8 is a schematic diagram illustrating still another exemplary display of menu screen to be displayed when "terrestrial" is selected.

Referring to FIG. 8, there is shown another exemplary display of the menu screen.

In the example shown in FIG. 8, all category icons except for the terrestrial broadcast icon 54 disappear and item icon array R2 moves to the left from the position at which R2 has been displayed.

In the example shown in FIG. 8, the channel icon 85 indicative of channel 4 is displayed larger than that shown in FIG. 6 and a wider area is allocated to channel 4 than those allocated to other channels. Text "keyword hit" is displayed in the newly allocated wider area. To the right thereof, keywords "movie", "comedy", and "Pether Gramme" included in the program information are displayed in line. Namely, in this example, the user registered at least "movie", "comedy", and "Pether Gramme" as keywords beforehand.

In the right half of the screen, "Channel Selection" that is operated to select channel 4 to view "Ocean Deluxe" to be broadcast on channel 4 and "Program Description" to be obtained from EPG data and selected to display an outline of "Ocean Deluxe" are displayed as lower-layer items of a channel 4 program.

Checking the keywords displayed as above, the user is able to know the reason why "Ocean Deluxe" has been selected as a recommended program.

Further, keywords are displayed when a predetermined operation, such as pressing the option key arranged on the remote controller 31 for example, is executed, so that a screen friendlier to the user can be displayed than that shown in FIG. 7 in which keywords are also displayed. If keywords were displayed as shown with the screen shown in FIG. 7, from the viewpoint of a display space, it has to reduce the number of channels that can be displayed in one screen, thereby reducing the size of lists. The information about programs to be broadcast on each channel needs to be displayed in smaller character size, which lowers a visibility.

The processing by the DTV 1 to realize the above-mentioned menu screen display capabilities will be described later with reference to a flowchart.

Figure 9:
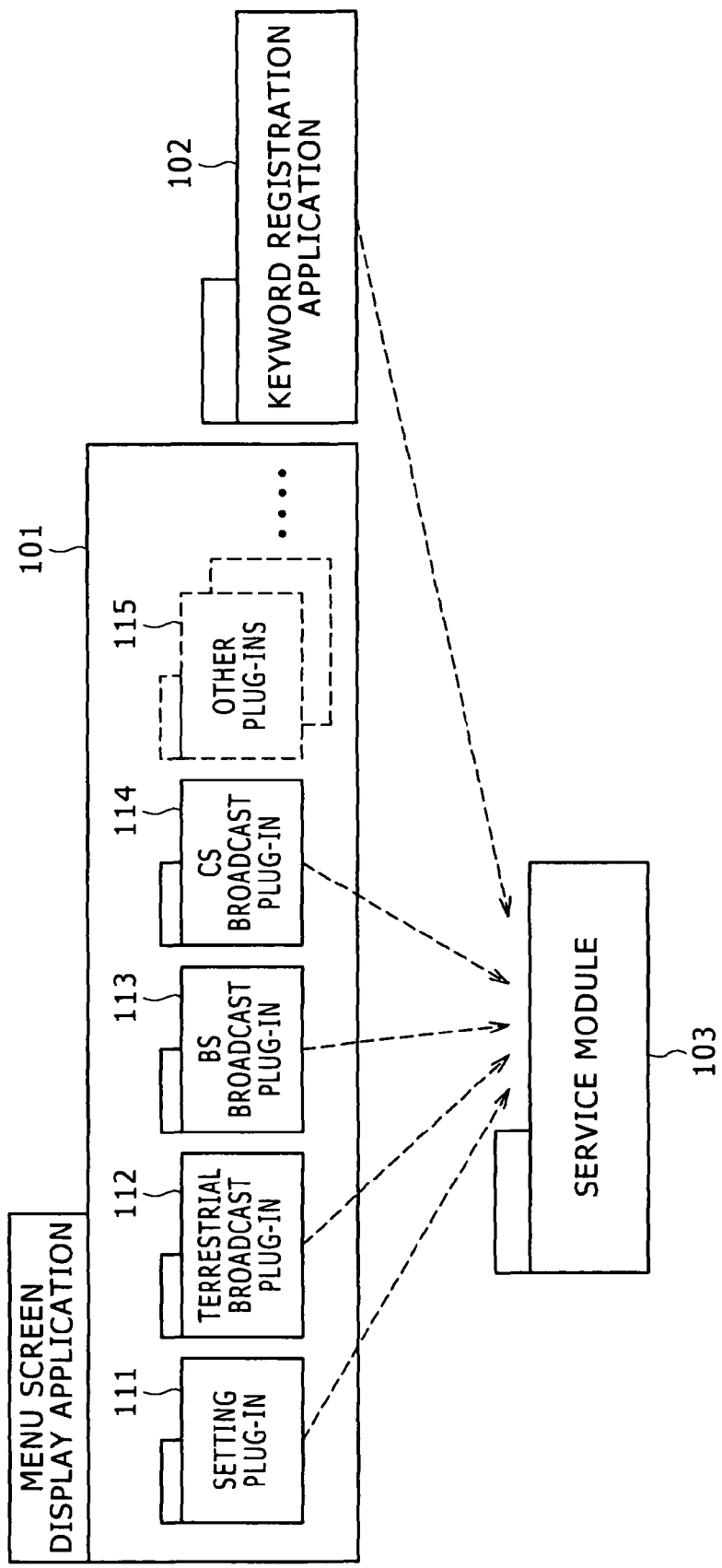
FIG. 9 is a schematic diagram illustrating exemplary software to be prepared for DTV.

Referring to FIG. 9, there is shown an example of software (or an application program) to be provided for the DTV 1 to realize the menu screen display capabilities.

The DTV 1 has a menu screen display application 101, a keyword registration application 102, and service module 103. The menu screen display application 101 has a setting plug-in 111, a terrestrial broadcast plug-in 112, a BS broadcast plug-in 113, a CS broadcast plug-in 114, and other plug-ins 115.

A plug-in denotes a software module for realizing a capability of a selected item provided in the DTV 1. For example, in addition to the setting plug-in 111, the terrestrial broadcast plug-in 112, the BS broadcast plug-in 113, and the CS broadcast plug-in 114, a plug-in for realizing a capability associated with timer recording (a plug-in for realizing a capability of "timer recording" or "timer recording checking" shown in FIG. 5), a plug-in for controlling a DLNA device connected to the DTV 1 via network (a plug-in for realizing a capability of "DLNA device" shown in FIG. 5), and a plug-in for controlling a device connected to the DTV 1 via IEEE 1394 cable (a plug-in for realizing a capability of "IEEE 1394 device" shown in FIG. 5) are incorporated as other plug-ins 115.

The menu screen display application 101 controls the display of the entire menu screen. For example, the menu screen display application 101 displays a menu screen composed of category icons and item icons by use of data stored in the display data storage block 41 and switches between menu screens in accordance with a user operation. In addition, the menu screen display application 101 notifies each plug-in of a category selected by the user every time a user operation is executed.

The setting plug-in 111 controls the display of a menu screen when category "setting" is selected. When information that category "setting" is selected comes from the menu screen display application 101, the setting plug-in 111 displays item icons by use of data stored in the display data storage block 41 in accordance with the array shown in FIG. 5 and, if there are lower-layer items when a predetermined item is selected, displays these lower-layer items.

For example, when item "keyword hit setting" (refer to FIG. 5) belonging to category "setting" is selected, the setting plug-in 111 displays items "keyword hit display" and "keyword registration" of a lower-layer of item "keyword hit setting".

When item "keyword hit display" is selected, the setting plug-in 111 lets the user select on or off of a keyword display capability (or a keyword hit capability) as shown in FIG. 8, thereby setting the on or off of the keyword hit capability to the service module 103. If item "keyword registration" is selected, the setting plug-in 111 starts up the keyword registration application 102 to execute keyword registration processing.

The terrestrial broadcast plug-in 112 controls the display of a menu screen when category "terrestrial broadcast" is selected. When information that category "terrestrial broadcast" is selected comes from the menu screen display application 101, the terrestrial broadcast plug-in 112 displays item icons by use of data stored in the display data storage block 41 in accordance with the array shown in FIG. 5 and, when a predetermined item is selected, displays lower-layer items if any.

For example, the terrestrial broadcast plug-in 112 enquires the service module 103 for the information about programs to be broadcast on the terrestrial analog broadcast channel and the terrestrial digital broadcast channel and displays the information about each program on the basis of a response from the service module 103. This response from the service module 103 contains the information indicative whether a keyword is contained in the program information, in addition to the title, broadcast channel name, and broadcast time zone of each program. If a response that a keyword is contained in the program information for a particular program comes, the terrestrial broadcast plug-in 112 displays a star icon beside the channel icon of the channel on which that program is to be broadcast.

The BS broadcast plug-in 113 controls the display of a menu screen when category "BS broadcast" is selected. When information that category "BS broadcast" is selected comes from the menu screen display application 101, the BS broadcast plug-in 113 displays item icons by use of data stored in the display data storage block 41 in accordance with the array shown in FIG. 5 and, when a predetermined item is selected, displays lower-layer items if any.

For example, the BS broadcast plug-in 113 enquires the service module 103 for the information about a program to be broadcast on each BS broadcast channel and displays the information about each program on the basis of the response from the service module 103. This response from the service module 103 contains the information indicative whether a keyword is contained in the program information, in addition to the title, broadcast channel name, and broadcast time zone of each program. If a response that a keyword is contained in the program information for a particular program comes, the BS broadcast plug-in 113 displays a star icon beside the channel icon of the channel on which that program is to be broadcast.

The CS broadcast plug-in 114 controls the display of a menu screen when category "CS broadcast" is selected. When information that category "CS broadcast" is selected comes from the menu screen display application 101, the CS broadcast plug-in 114 displays item icons by use of data stored in the display data storage block 41 in accordance with the array shown in FIG. 5 and, when a predetermined item is selected, displays lower-layer items if any.

For example, the CS broadcast plug-in 114 enquires the service module 103 for the information about a program to be broadcast on each CS broadcast channel and displays the information about each program on the basis of the response from the service module 103. This response from the service module 103 contains the information indicative whether a keyword is contained in the program information, in addition to the title, broadcast channel name, and broadcast time zone of each program. If a response that a keyword is contained in the program information for a particular program comes, the CS broadcast plug-in 114 displays a star icon beside the channel icon of the channel on which that program is to be broadcast.

The keyword registration application 102 accepts the registration by the user of a keyword on the basis of which a recommended program is selected and registers the accepted keyword to the service module 103. The keyword registration application 102 starts up when specified by the setting plug-in 111, for example, thereby displaying a keyword registration screen.

The keyword registration by the user may be executed by operating a software keyboard displayed on the registration screen to enter a keyword into a predetermined entry box or by selecting a predetermined keyword from a keyword list displayed on the registration screen.

The service module 103 manages various pieces of data and settings for use in displaying the menu screen, thereby providing data to each application and each plug-in and notifying each application and each plug-in of the contents of setting. For example, the service module 103 provides the information about programs stored in the EPG data storage block 42 to the terrestrial broadcast plug-in 112, the BS broadcast plug-in 113, and the CS broadcast plug-in 114.

The menu screen is displayed by executing the above-mentioned software programs by the control block 11 and the display image generator/output block 21 for example.

The following describes the processing to be executed by the DTV 1 with reference to flowcharts.

First, keyword registration processing will be described with reference to the flowchart shown in FIG. 10.

When a home key on the remote controller 31 is pressed, the menu screen display application 101 displays a menu screen by use of data stored in the display data storage block 41 in step S1. Next, in step S2, the menu screen display application 101 switches between menu screens in accordance with a user operation. When an operation is executed by the user, a selected category is sent to a corresponding plug-in from the menu screen display application 101.

If category "setting" is selected by the user and item "keyword hit setting" is selected from items belonging to category "setting", the setting plug-in Ill displays "keyword hit display" and "keyword registration" that are items of a lower layer of item "keyword hit setting" in step S3.

If item "keyword registration" is selected, the setting plug-in 111 goes to step S4 to start up the keyword registration application 102.

In step S5, the keyword registration application 102 displays a keyword registration screen and goes to step S6 to accept keyword registration to be executed by the user through the registration screen.

In step S7, the keyword registration application 102 registers the keyword entered by the user with the service module 103. The registered keyword is stored in the memory 32 to be managed by the service module 103.

When the keyword registration has been completed, the setting plug-in 111 returns to a status in which "keyword hit display" and "keyword registration" that are items of a lower layer of item "keyword hit setting" are displayed, in step S8.

In step S9, if item "keyword hit display" is selected, the setting plug-in 111 displays a screen for selecting the on or off of the keyword hit capability.

If the keyword hit capability is turned on by the user, the setting plug-in 111 registers the on status of the keyword hit capability to the service module 103. In the service module 103, a flag indicative of the status of the keyword hit capability is set as indicative of the on status, which is held as it is. Then, this processing exits.

Figure 11:
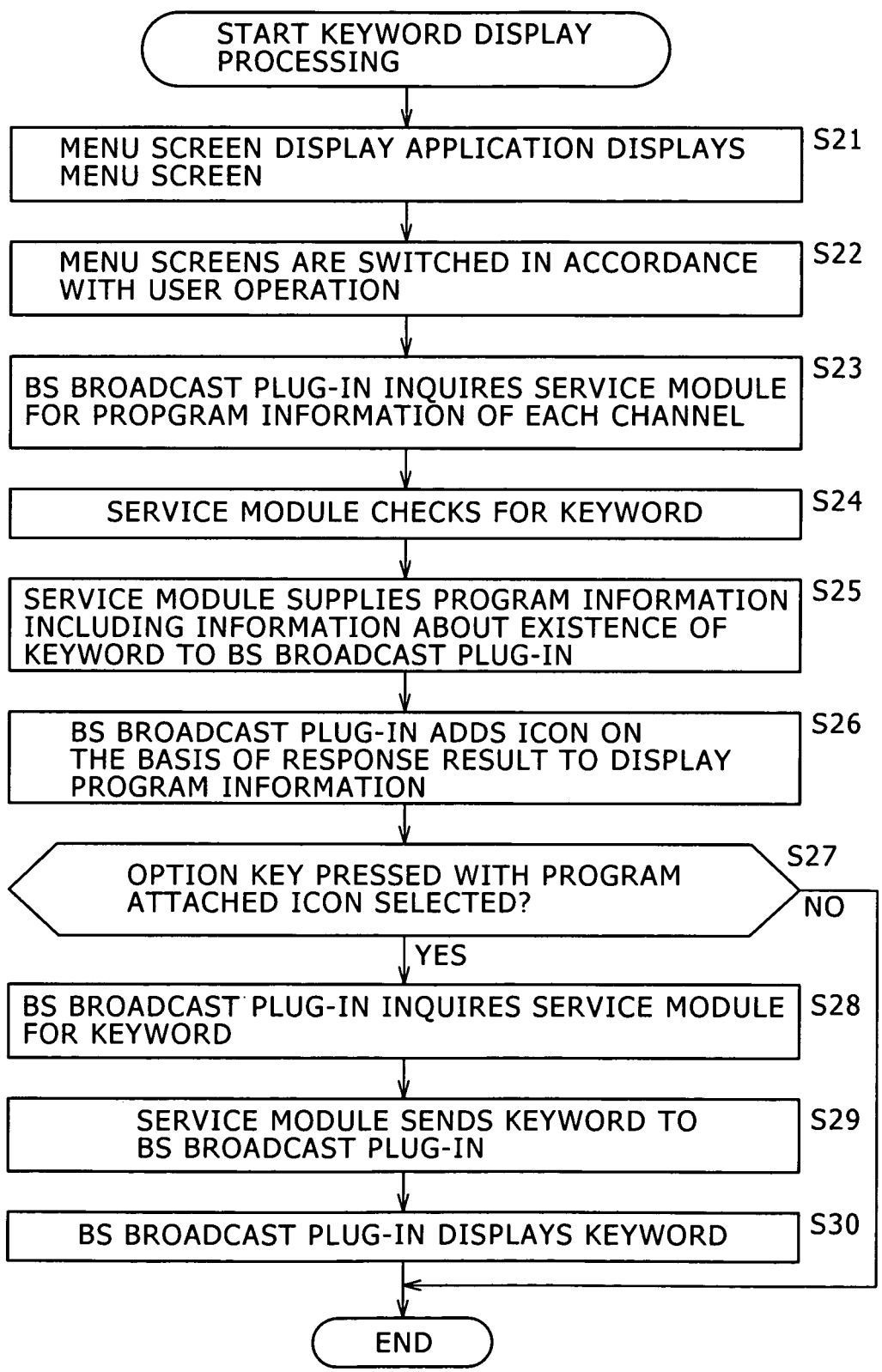
FIG. 11 is a flowchart indicative of DTV keyword display processing.

The following describes keyword display processing with reference to the flowchart shown in FIG. 11. In the following description, the processing to be executed with category "BS broadcast" selected is used for example.

Figure 10:
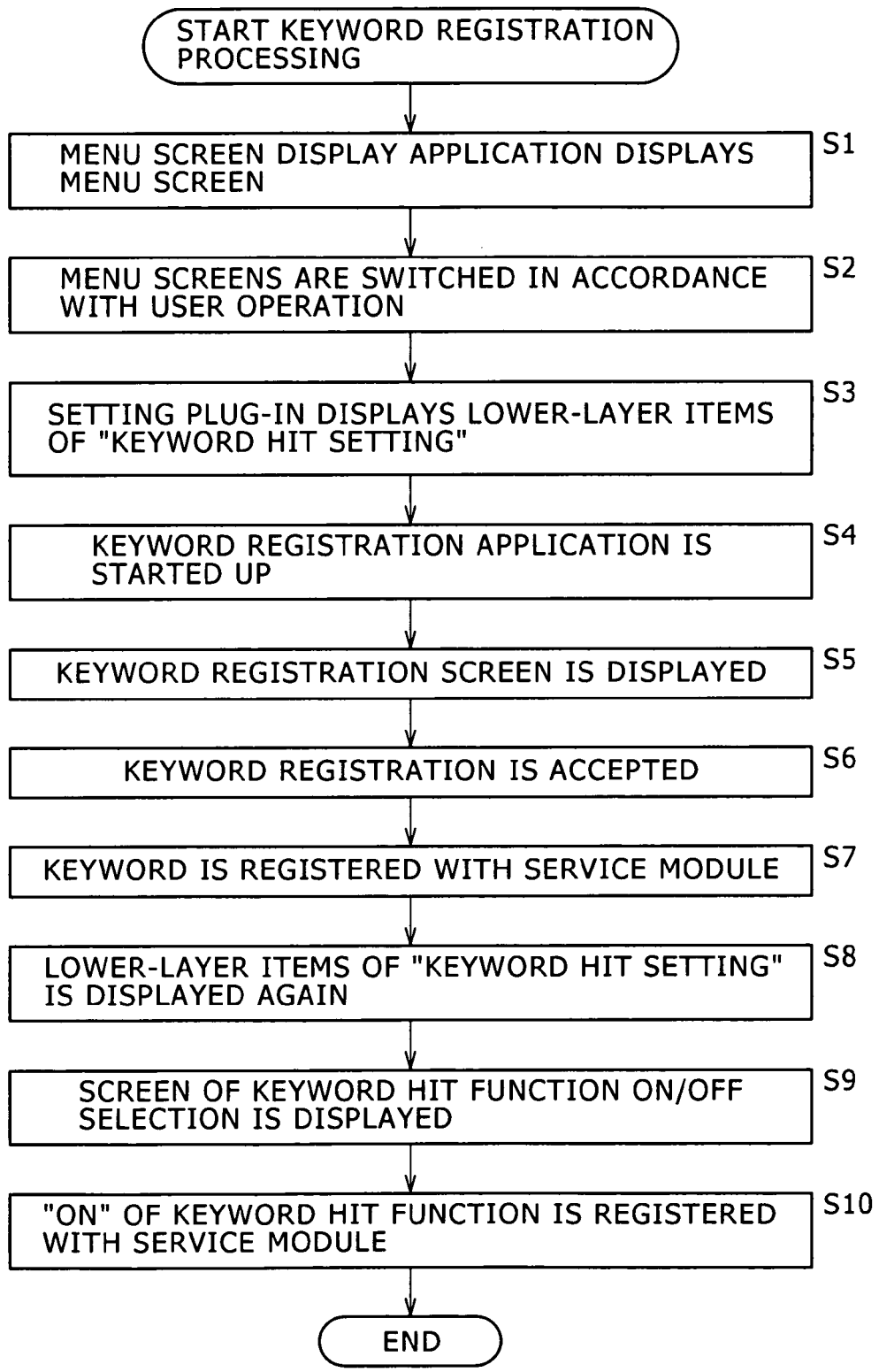
FIG. 10 is a flowchart indicative of DTV keyword registration processing.

Processes of steps S21 and S22 are substantially the same as those of steps S1 and S2 shown in FIG. 10. Namely, when the home key on the remote controller 31 is pressed, the menu screen display application 101 displays a menu screen in step S21 and goes to step S22 to switch between menu screens in accordance with a user operation. If category "BS broadcast" is selected by the user, the menu screen display application 101 notifies the BS broadcast plug-in 113 of this selection.

In step S23, the BS broadcast plug-in 113 enquires the service module 103 for the information about a program to be broadcast on each BS broadcast channel.

In step S24, the service module 103 checks whether a keyword is contained in the program information for each program to be broadcast on each BS broadcast channel.

In step S25, the service module 103 sends to the BS broadcast plug-in 113 the information such as the title, channel name, and broadcast time zone of each program to be broadcast on each channel and the information indicative of the keyword inclusion as a response to the enquiry.

In step S26, the BS broadcast plug-in 113 displays the information including the title, channel name, and broadcast time zone of the program to be broadcast on each channel in the display range of the menu screen. At the same time, for program of which program information contains a keyword, the BS broadcast plug-in 113 displays a star icon beside the channel icon of the channel on which that program is broadcast. Consequently, the menu screens as shown in FIGS. 6 and 7 are displayed.

In step S27, the BS broadcast plug-in 113 determines on the basis of a notification from the menu screen display application 101 for example whether the option key has been pressed with the program displayed beside a star icon selected with the cursor 71. If the option is found pressed in this status, the BS broadcast plug-in 113 goes to step S28.

In step S28, the BS broadcast plug-in 113 notifies the service module 103 of the currently selected program, thereby enquiring for the keyword contained in the program information of that program.

In step S29, the service module 103 sends the keyword contained in the program information to the BS broadcast plug-in 113.

In step S30, the BS broadcast plug-in 113 displays the keywords supplied from the service module 103 in line. Consequently, the keywords are lined up as shown in FIG. 8. This processing ends when the display of the keywords has been completed or if the option key is found not pressed in the state when the program having a star icon beside the channel icon selected with the cursor 71 as in step S27.

As described above, the keywords on the basis of which a recommended program is selected can be displayed by the above-mentioned processing when the user wanted.

In the above description, when item "keyword hit setting" is selected from items belonging to category "setting", "keyword hit display" and "keyword registration" are displayed as items of a lower layer of item "keyword hit setting". Alternatively, if registered keywords are managed for each user, item "user switching" may also be displayed as shown in FIG. 12.

For example, by selecting own name from a name list displayed when item "user switching" is selected, the user of the DTV 1 can have recommended program selection done on the basis of keywords registered by that user.

To be more specific, if user A has registered "movie" as a keyword, selecting "user A" from the screen as shown in FIG. 12 allows the selection of a program with "movie" contained in the program information, as a recommended program. If user B has registered "sports" as a keyword, selecting "user B" from the screen as shown in FIG. 12 allows the selection of a program with "sports" contained in the program information, as a recommended program.

In this case, if "user A" is selected from the screen as shown in FIG. 12, a star icon is displayed in the vicinity of the channel icon of a program of which program information contains "movie" and a star icon is not displayed in the vicinity of the channel icon of a program of which program information does not contain "movie", in the menu screen. Likewise, if "user B" is selected from the screen as shown in FIG. 12, a star icon is displayed in the vicinity of the channel icon of a program of which program information contains "sports" and a star icon is not displayed in the vicinity of the channel icon of a program of which program information does not contain "sports", in the menu screen.

Alternatively, rather than displaying a star icon beside the channel icon of a program selected on the basis of keywords registered by one user, a star icon may be displayed beside the channel icon of a program selected on the basis of keywords registered by other users.

Consequently, in the case of the above-mentioned example, stat icons are displayed in the vicinity of the channel icon of the program of which program information contains keyword "movie" and the channel icon of the program of which program information contains item "sports" in the channel icon array to be displayed when any of the broadcast wave categories is selected.

It should be noted that, in the above-mentioned case, different icons may be displayed for different users who have registered keywords. For example, a star icon may be displayed in the vicinity of the channel icon of the program of which program information contains "movie" that is a keyword registered by user A and a circle ("○") icon in the vicinity of the channel icon of the program of which program information contains "sports" that is a keyword registered by user B.

Consequently, each user is able to confirm which program has been selected on the basis of the keyword registered by the user.

In addition to DTVs, the above-mentioned menu screen may be displayed by digital recording/reproducing devices, such as hard disc recorders and DVD (Digital Versatile Disc) recorders, and personal computers that handle program guides.

In the above-mentioned configuration, the icon indicative of each recommended program is star-shaped; however, icons of other shapes may be used to display various kinds of information.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Referring to FIG. 13, there is shown an exemplary configuration of a personal computer for running programs for executing the above-mentioned sequence of processing operations. A CPU 201 executes various processing operations in accordance with programs stored in a ROM 203 or a storage block 208. A RAM 203 appropriately stores programs and data that are necessary for the CPU 201 to execute processing operations. These CPU 201, ROM 202, and RAM 203 are interconnected by a bus 204.

The CPU 201 is also connected to an input/output interface 205 via the bus 204. The input/output interface 205 is connected to an input block 206 made up of a keyboard, a mouse, and microphones for example, and an output block 207 made up of a display and a speaker for example. The CPU 201 executes various processing operations in accordance with commands entered through the input block 206. Then, the CPU 201 outputs processing results to the output block 207.

The storage block 208 connected to the input/output interface 205, made up of a hard disc drive for example, stores programs to be executed by the CPU 201 and data necessary for the execution. A communication block 209 communicates with external devices via networks, such as the Internet and a LAN (Local Area Network).

It is also practicable to obtain programs through the communication block 209 and stores the obtained programs into the storage block 208.

A drive 210 connected to the input/output interface 205 drives removable media 211, such as a magnetic disc, an optical disc, a magneto-optical disc, and a semiconductor memory loaded on the drive 210, thereby obtaining programs and data therefrom. The obtained programs and data are stored in the storage block 208 as need arises.

As shown in FIG. 13, program recording media for storing programs that are installed on a computer for execution is made up of the removable media 211 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 202 in which programs are temporarily or permanently stored, or a hard disc drive that forms the storage block 208. Storing of programs into program recording media is executed by use of wired or wireless communication media, such as a LAN, the Internet, or digital satellite broadcasting, via the communication block. 209 that provides an interface, such as a router and a modem, as need arises.

It should be noted herein that the steps for describing each program recorded in recording media include the processing operations which are sequentially executed in a time-dependent manner and also the processing operations which are executed concurrently or discretely.

While preferred embodiments of the present invention have been described using specific terms, such description is for illustrative purpose, and it is to be understood that changes and variations may be made without departing from the spirit or scope of the following claims.

The invention claimed is:

1. A display control apparatus comprising:

selecting means for selecting, from programs to be broadcast on each channel, a program of which program information contains a registered keyword; and display controlling means for displaying, on a same screen display, a plurality of category icons in line as information indicative of a category and predetermined information in the vicinity of an icon indicative of a channel on which a program selected by said selecting means is broadcast among icons belonging to a selected category icon of the category icons displayed in line as information indicative of a selectable channel, the line of the plurality of category icons being displayed crossing the line of the icons indicative of a selectable channel, wherein the predetermined information indicates that program information of a selected program contains a registered keyword, and when a predetermined operation is executed in a status in which a channel is selected from the plurality of selectable channels having the respective icons displayed in line as information indicative of a selectable channel on the same screen display crossing the plurality of category icons displayed in line, wherein in said status said predetermined information and program information other than a registered keyword of a program to be broadcast on the selected channel is displayed on the same screen display in the vicinity of the icon indicative of the selected channel and with the icon indicative of the selected channel displayed in a first display area having a first size, displaying the icons indicative of a selectable channel in the line as displayed, with the line of the icons indicative of a selectable channel being moved from a position at which the line of the icons indicative of a selectable channel is displayed, when the predetermined operation is executed with (i) said keyword contained in the program information of the program to be broadcast on the selected channel displayed in a second display area including the icon indicative of the selected channel, the second display area being wider than display areas allocated respectively to the plurality of selectable channels other than the selected channel and having a second size larger than the first size, and (ii) only the selected category icon of the category icons.

2. The display control apparatus according to claim 1, further comprising:

registration means for registering, for each user, keywords specified by a plurality of users, wherein said selecting means selects a program of which program information contains a keyword specified by a user from programs to be broadcast on each channel.

3. The display control apparatus according to claim 1, further comprising:

registration means for registering, for each user, keywords specified by a plurality of users, wherein said selecting means selects a program of which program information contains said keyword specified by a plurality of users from programs to be broadcast on each channel and said display controlling means displays information that is different for different users who specified a keyword on which program selection is based in the vicinity of an icon indicative of a channel on which a program selected by said selecting means is broadcast.

4. A display control method comprising the steps of:

selecting, from programs to be broadcast on each channel, a program of which program information contains a registered keyword; and displaying, on a same screen display, a plurality of category icons in line as information indicative of a category and predetermined information in the vicinity of an icon indicative of a channel on which a selected program is broadcast among icons belonging to a selected category icon of the category icons displayed in line as information indicative of a selectable channel, the line of the plurality of category icons being displayed crossing the line of the icons indicative of a selectable channel, wherein the predetermined information indicates that program information of a selected program contains a registered keyword and, when a predetermined operation is executed in a status in which a channel is selected from the plurality of selectable channels having the respective icons displayed in line as information indicative of a selectable channel on the same screen display crossing the plurality of category icons displayed in line, wherein in said status said predetermined information and program information other than a registered keyword of a program to be broadcast on the selected channel is displayed on the same screen display in the vicinity of the icon indicative of the selected channel and with the icon indicative of the selected channel displayed in a first display area having a first size, displaying the icons indicative of a selectable channel in the line as displayed, with the line of the icons indicative of a selectable channel being moved from a position at which the line of the icons indicative of a selectable channel is displayed, when the predetermined operation is executed with (i) said keyword contained in the program information of the program to be broadcast on the selected channel displayed in a second display area including the icon indicative of the selected channel, the second display area being wider than display areas allocated respectively to the plurality of selectable channels other than the selected channel and having a second size larger than the first size, and (ii) only the selected category icon of the category icons.

5. A non-transitory computer-readable medium storing a computer-readable program for implementing a process, comprising:

selecting, from programs to be broadcast on each channel, a program of which program information contains a registered keyword; and displaying, on a same screen display, a plurality of category icons in line as information indicative of a category and predetermined information in the vicinity of an icon indicative of a channel on which a selected program is broadcast among icons belonging to a selected category icon of the category icons displayed in line as information indicative of a selectable channel, the line of the plurality of category icons being displayed crossing the line of the icons indicative of a selectable channel, wherein the predetermined information indicates that program information of a selected program contains a registered keyword and, when a predetermined operation is executed in a status in which a channel is selected from the plurality of selectable channels having the respective icons displayed in line as information indicative of a selectable channel on the same screen display crossing the plurality of category icons displayed in line, wherein in said status said predetermined information and program information other than a registered keyword of a program to be broadcast on the selected channel is displayed on the same screen display in the vicinity of the icon indicative of the selected channel and with the icon indicative of the selected channel displayed in a first display area having a first size, displaying the icons indicative of a selectable channel in the line as displayed, with the line of the icons indicative of a selectable channel being moved from a position at which the line of the icons indicative of a selectable channel is displayed, when the predetermined operation is executed with (i) said keyword contained in the program information of the program to be broadcast on the selected channel displayed in a second display area including the icon indicative of the selected channel, the second display area being wider than display areas allocated respectively to the plurality of selectable channels other than the selected channel and having a second size larger than the first size, and (ii only the selected category icon of the category icons.

6. A display control apparatus comprising:

a selecting block configured to select, from programs to be broadcast on each channel, a program of which program information contains a registered keyword; and a display controlling block configured to display, on a same screen display, a plurality of category icons in line as information indicative of a category and predetermined information in the vicinity of an icon indicative of a channel on which a program selected by said selecting block is broadcast among icons belonging to a selected category icon of the category icons displayed in line as information indicative of a selectable channel, the line of the plurality of category icons being displayed crossing the line of the icons indicative of a selectable channel, wherein the predetermined information indicates that program information of a selected program contains said registered keyword and, when a predetermined operation is executed in a status in which a channel is selected from the plurality of selectable channels having the respective icons displayed in line as information indicative of a selectable channel on the same screen display crossing the plurality of category icons displayed in line, wherein in said status said predetermined information and program information other than a registered keyword of a program to be broadcast on the selected channel is displayed on the same screen display in the vicinity of the icon indicative of the selected channel and with the icon indicative of the selected channel displayed in a first display area having a first size, displaying the icons indicative of a selectable channel in the line as displayed, with the line of the icons indicative of a selectable channel being moved from a position at which the line of the icons indicative of a selectable channel is displayed, when the predetermined operation is executed with (i) said keyword contained in program information of a program to be broadcast on the selected channel displayed in a second display area including the icon indicative of the selected channel, the second display area being wider than display areas allocated respectively to the plurality of selectable channels other than the selected channel and having a second size larger than the first size, and (ii) only the selected category icon of the category icons.

* * * * *